(12) United States Patent
Sprogar et al.

(10) Patent No.: US 10,417,857 B2
(45) Date of Patent: Sep. 17, 2019

(54) ELECTRONIC-FIELD COMMUNICATION FOR GAMING ENVIRONMENT AMPLIFICATION

(71) Applicant: Interblock d.d., Menges (SI)

(72) Inventors: Matjaž Sprogar, Kamnik (SI); Urban Bergant, Kamnik (SI); Joze Pececnik, Las Vegas, NV (US)

(73) Assignee: Interblock d.d., Menges (SI)

( * ) Notice: Subject to any disclaimer, the term of this patent is extended or adjusted under 35 U.S.C. 154(b) by 0 days.

(21) Appl. No.: 15/713,575

(22) Filed: Sep. 22, 2017

(65) Prior Publication Data

US 2019/0096160 A1    Mar. 28, 2019

(51) Int. Cl.
| | |
|---|---|
| *A63F 9/24* | (2006.01) |
| *G07F 17/32* | (2006.01) |
| *G06F 3/01* | (2006.01) |
| *G06F 3/03* | (2006.01) |

(52) U.S. Cl.
CPC .......... *G07F 17/3206* (2013.01); *G06F 3/014* (2013.01); *G06F 3/017* (2013.01); *G06F 3/0304* (2013.01); *G07F 17/3209* (2013.01); *G07F 17/3211* (2013.01); *G07F 17/3213* (2013.01); *G07F 17/3223* (2013.01); *G07F 17/3288* (2013.01); *G07F 17/3295* (2013.01)

(58) Field of Classification Search
CPC ............. G07F 17/3206; G07F 17/3209; G07F 17/3204; A63F 2300/6045
See application file for complete search history.

(56) References Cited

U.S. PATENT DOCUMENTS

| | | | |
|---|---|---|---|
| 4,542,903 A | * | 9/1985 | Yokoi ................. A63F 9/24 |
| | | | 345/1.1 |
| RE41,196 E | | 4/2010 | Selby |
| 8,487,905 B2 | | 7/2013 | Kandziora et al. |
| 8,494,054 B2 | | 7/2013 | Nair et al. |
| 8,510,567 B2 | | 8/2013 | Alderucci et al. |
| 8,784,197 B2 | | 7/2014 | Alderucci et al. |
| 9,111,413 B2 | | 8/2015 | Gagner et al. |

(Continued)

OTHER PUBLICATIONS

International Patent Application No. PCT/IB2018/001145; Int'l Search Report and the Written Opinion; dated Feb. 22, 2019; 13 pages.

*Primary Examiner* — Steve Rowland
(74) *Attorney, Agent, or Firm* — BakerHostetler

(57) ABSTRACT

An electronic gaming system with a visual display system has a player input station for at least entering wagers on an underlying wagering event. The system includes a processor providing signal content to the visual display system. The player input station further has an electronic-field communication input device that is simultaneously responsive to a player's hand movements in three dimensions and with respect to velocity. A communication link exists from the electronic-field communication input device to the processor and then to the visual display system to provide image signals transmitted from the processor to the visual display system. The image signals are varied in response to sensed hand movements in at least one of the three dimensions and velocity, wherein the visual display system displays an image varied in response to sensed hand movements. The caused variations have no effect on a random outcome in the underlying wagering event.

20 Claims, 2 Drawing Sheets

(56) References Cited

U.S. PATENT DOCUMENTS

| | | |
|---|---|---|
| 9,126,113 B2 | 9/2015 | Johnson et al. |
| 9,207,820 B2 | 12/2015 | Lamont et al. |
| 9,230,395 B2 | 1/2016 | Mattice et al. |
| 9,269,215 B2 | 2/2016 | Thompson et al. |
| 9,317,110 B2 | 4/2016 | Lutnick et al. |
| 2007/0259717 A1* | 11/2007 | Mattice ............... A63F 3/00157 463/36 |
| 2008/0300055 A1* | 12/2008 | Lutnick ............... G07F 17/3209 463/39 |
| 2009/0143141 A1 | 6/2009 | Wells et al. |
| 2010/0253319 A1* | 10/2010 | Cehelnik ................ G06F 3/017 324/72 |
| 2014/0018166 A1 | 1/2014 | Guild et al. |
| 2015/0268729 A1* | 9/2015 | Cehelnk ................ G06F 3/017 340/870.3 |
| 2016/0041622 A1* | 2/2016 | Mattice .................. G06F 3/013 463/37 |

\* cited by examiner

ELECTRONIC-FIELD COMMUNICATION FOR GAMING ENVIRONMENT AMPLIFICATION

BACKGROUND OF THE INVENTION

1. Field of the Invention

The present invention relates to the field of gaming apparatus and methods, and to incidental components on gaming apparatus that can visually and sonically enhance game play.

2. Background of the Art

Gaming systems in a casino may include gaming tables, electronic gaming machines (e.g., video slots, reel slots, interactive video gaming), and other apparatus where individual players physically interact with the gaming system by physical movement. Online gaming has further expanded the range of gaming technologies into smart phones, pads, and other personal devices.

Numerous methods have been suggested for players to further interact with the gaming environment. Let It Ride™ poker used to provide music and light displays on a mounted post to alert large areas of the casino that a significant winning outcome had been achieved.

A present D.E.Q. betting box (the Platinum Plus® wagering system) provides a light display around the edges of the box when wagers are accepted and locked in. A proximity sensor used in bonus wagers lights up when a token/chip is placed on the sensor cover, and remains lit when the eager is locked in.

Other systems have used biometric input and player motion sensing (even facial recognition) to provide secondary events, as noted in some of the following references.

U.S. Pat. Nos. 8,510,567 and 8,784,197 (Alderucci) provide methods and corresponding systems for accessing services in a gaming or other environment based on conditional biometric identity verification. In one aspect, this includes the step or steps of determining a location of a gaming device having a display and at least one biometric sensor associated therewith; prompting a user of the gaming device for at least one item of physical biometric data with the biometric sensor based at least on the location of the gaming device; receiving the at least one item of physical biometric data; and enabling at least one service on the gaming device based on a match between the at least one item of physical biometric data received and at least one authenticated item of physical biometric data associated with the user.

U.S. Pat. No. 9,317,110 (Lutnick) provides a game with hand motion controls, and in various embodiments, the motion of a wristband is used to control games.

U.S. Pat. No. 9,269,215 (Thompson) discloses an electronic gaming system with human gesturing inputs. Examples relate to systems and methods, which may receive wagers on one or more paylines. These relate to an electronic gaming system which allows a player to make one or more inputs via human gesturing, and associated methods.

U.S. Pat. No. 9,230,395 (Mattice) describes techniques for controlling a wager-based game played at a gaming system. In one embodiment the gaming system may include a gesture input interface device operable to detect movements gestures associated with one or more persons, and a gesture interpretation component operable to identify selected movements or gestures detected by the gesture input interface device. In one embodiment, the gesture interpretation component may also be operable to generate gesture interpretation information relating to interpretation of the selected movements or gestures. In one embodiment, the gaming system may be operable to automatically detect a gesture by a player participating in a game session at the gaming system; interpret the gesture with respect to a set of criteria; generate gesture interpretation information relating to the interpretation of the gesture; and advance a state of the game session using at least a portion of the gesture interpretation information.

U.S. Pat. No. 9,126,113 (Johnson) relates generally to different devices, methods, systems, and computer program products for a gaming machine that includes a projection button panel. The projection button panel may include one or more projection buttons configured to receive user input. Each projection button is may include a projection surface disposed within the button capable of being viewed by a player of the gaming machine. Each projection button may also include a button projector proximate to the projection surface. Further, each projection button may be configured to receive button image information and to project, based on the received button image information, a button image onto the projection surface. Each projection button may also include one or more sensors capable of being activated responsive to activation of the button. The gaming machine may also include one or more controllers in communication with the main display and the button assembly. The one or more controllers may be configured to transmit the image information for display at one or more of the buttons, receive the signal from the button assembly indicating that one or more of the sensors have been activated, and/or process the received signal.

U.S. Pat. No. 9,111,413 (Gagner) discloses a wagering game system and its operations. In some embodiments, the operations can include detecting one or more audible communications made during a wagering game session, evaluating the one or more audible communications in context with gaming information associated with the wagering game session; and presenting an automated response to the one or more audible communications based on the evaluating of the one or more audible communications in context with gaming information.

U.S. Pat. No. 8,487,905 (Kandziora) provides an electrode arrangement for a capacitive sensor device and for a capacitive sensor, respectively, for detecting a position and/or an approach of an object, which comprises a sensor electrode and a first shield electrode, wherein the sensor electrode is arranged on a first side of a substantially flat substrate with a first side and a second side, and wherein the first shield electrode is arranged on the second side of the substrate and serves for shielding the alternating electric field emitted by the sensor electrode from ground. There is also provided a foil with an electrode arrangement according to the invention as well as a method for the production of a display arrangement with an electrode arrangement according to the invention.

U.S. Pat. No. 8,494,054 (Nair) discloses methods and apparatus, including computer program products, implementing and using techniques for computing motion vectors in a digital video sequence. A recursive hierarchical method is used to determine a motion vector by using multiple resolution levels of the image frames. A best motion vector is first determined for the lowest resolution level. The best motion vector is propagated to a higher resolution level, where some adjustments are made and a new best motion vector is determined. The new best motion vector is propagated to yet another higher resolution level, where more adjustments are made and another new best motion vector is determined. This process is repeated until the highest, original, resolution level has been reached and a best motion vector has been identified. The identified best motion vector at the original resolution level is used for performing motion compensation.

U.S. Pat. No. RE41,196 (Selby) describes a method for measuring motion at a horizontal and vertical position between video fields of opposite parity comprising the steps of measuring the signal values of at least two vertically adjacent pixels from a video field of one parity and at least two vertically adjacent pixels from a video field of the opposite parity such that when taken together, the pixels represent contiguous samples of an image at said horizontal and vertical position, and determining whether the signal value of any of the pixels lies between the signal values of adjacent pixels in the field of opposite parity and in response outputting a zero motion value, otherwise, outputting a motion value equal to the lowest absolute difference between any of the pixels and its closest adjacent pixel in the field of opposite parity.

U.S. Pat. No. 9,207,820 (Lamont) describes a touch sensor capable of detecting multiple touches thereto is coupled with a digital device having multi-touch decoding capabilities. These multi-touch decoding capabilities comprise touch data acquisition, touch identification, touch tracking and processed touch data output to a device associated with the touch sensor. Touch identification comprises touch location(s) peak detection, touch location(s) nudging and touch location(s) interpolation. Touch data acquisition locates potential touches on the touch sensor. Peak detection identifies where potential touch locations are on the touch sensor. Once a potential touch location(s) has been identified, touch location nudging examines each adjacent location thereto and interpolation examines the adjacent touch location values to generate a higher resolution location of the touch. Touch tracking compares time sequential "frames" of touch identification data and then determines which touches are associated between frames for further processing, e.g., determining gesturing actions.

The disclosure of the patent and application documents discussed herein are incorporated by reference in their entirety, particularly for the enablement of components and systems for use in communication and image display.

SUMMARY OF THE INVENTION

An electronic gaming system with a visual display system has a player input station for at least entering wagers on an underlying wagering event. The system includes a processor providing signal content to the visual display system. The player input station further has an electronic-field (e-field) communication input device that is simultaneously responsive to a player's hand position, hand movements in three dimensions and with respect to velocity of hand movement. A communication link is present from the electronic-field (e-field) communication input device to the processor and then to the visual display system to provide is image signals transmitted from the processor to the visual display system or a separate light display box, bubble, or even non-image content visual display showing colors and color shifts. The image signals are configured to be varied in response to sensed hand movements in at least one of the three dimensions and velocity, wherein the visual display system displays an image varied in response to sensed hand movements. The caused variations preferably have no effect on a random outcome in the underlying wagering event. The variations can be in color schemes for entertainment in the visual display, as well as sound quality/volume/content, game speed, image positions, image orientation, size of images, theme in the images and the like.

An electronic gaming system has a player input station for at least entering wagers on an underlying wagering event with at least some aspect of the wagering event displayed on a visual display system. The gaming system further includes a processor configured to provide signal content to the visual display system of the at least some aspect of the wagering event displayed on the visual display system. The player input station further includes an e-field communication input device that is simultaneously responsive to a player's hand movements in three dimensions and with respect to velocity. The e-field (electronic field sensitivity, which measures and detects disturbances in a locally created electrical field, which is translated into a perception of movement through the electrical field by an object, such as a hand). The response to hand movements of the e-field communication input device produces signals transmitted from the processor to the visual display system, the signals causing variations in the at least some aspect of the wagering event displayed on the visual display system. These variations in the is displayed wagering event corresponds to at least one of the three dimensions and velocity. The caused variations have no effect on a random outcome in the underlying wagering event. The gaming system may further include a value-in-value-out credit creation component selected from the group consisting of a) a ticket-in-ticket-out system having a ticket-reading scanner and ticket printer, b) a currency validation system having a motor drive to advance currency past a scanner and/or c) a near field communication monetary service system, such as a wallet or iPay, or e-Pay systems. The NFC systems, which are preferably also a part of the present technology device, is used for RFID tag/card detection, primarily for player ID, player credit, and other activities separate from (but possibly parallel with) the maGestic light display. The NFC operation requires both a receiver in the gaming machine and a transmitter in a personal electronic communication device or smart card.

DETAILED DESCRIPTION OF THE INVENTION

Figure 1:
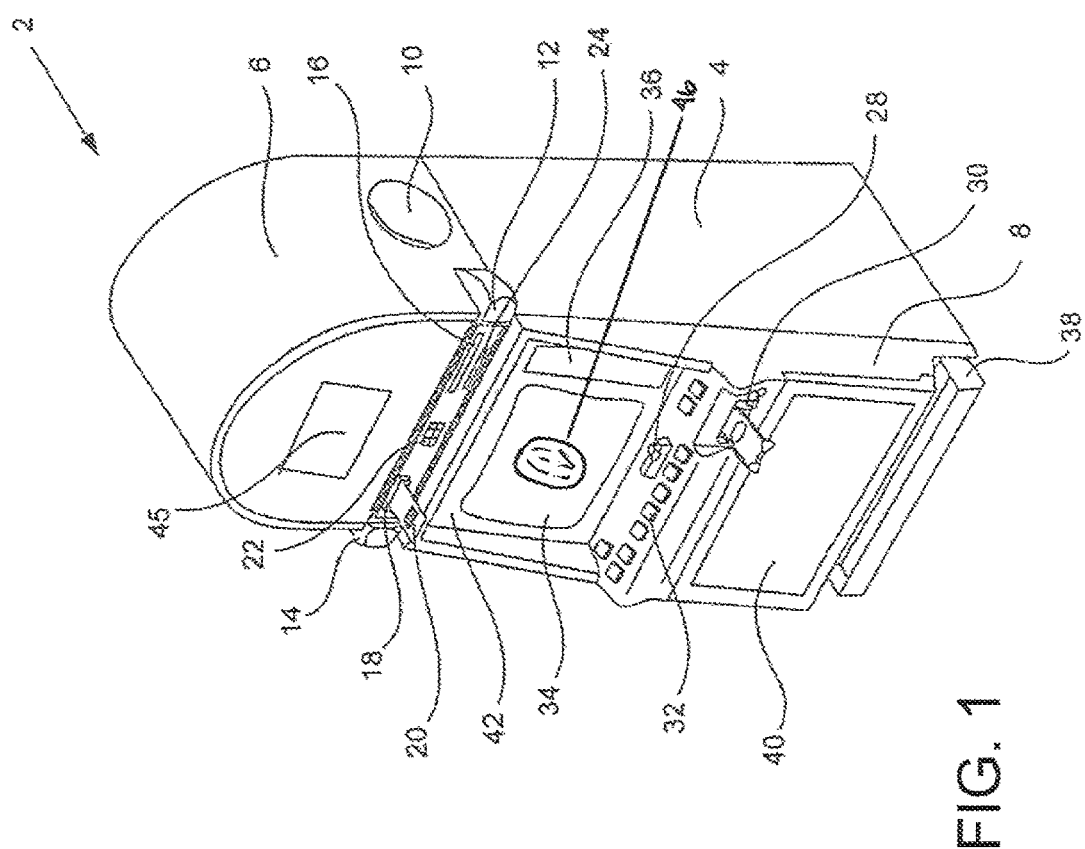
FIG. 1 discloses a player input panel having an electronic-field communication input device that is simultaneously responsive to a player's hand movements.

An electronic gaming system with a visual display system has a player input station for at least entering wagers on an underlying wagering event. The system includes a processor providing signal content to the visual display system. The player input station further has an electronic-field communication input device that is simultaneously responsive to a player's hand movements in three dimensions and preferably also with respect to velocity. A communication link is present from the electronic-field communication input device to the processor and then to the visual display system to provide image signals transmitted from the processor to the visual display system. The image signals are configured to be varied in response to sensed hand movements in at least one of the three dimensions and velocity, wherein the visual display system displays an image varied in response to sensed hand movements. The caused variations have no effect on a random outcome in the underlying wagering event. The variations can be in color schemes, and also sound quality/volume/content, game speed, image positions, image orientation, size of images, theme in the images and the like.

An electronic gaming system has a player input station for at least entering wagers on an underlying wagering event with at least some aspect of the wagering event displayed on a visual display system. The gaming system may be based on any of the known formats for gaming that use a visual display device with digital or analog imaging effects. This may include individual electronic gaming machines, banked electronic gaming machines, multiplayer gaming stations, game tables (for playing cards, dice, roulette wheels, and the like) with visual display systems, etc. For example, with a virtual roulette or dice game surrounded by multiple player input stations, there could be a 2-dimensional or 3-dimensional virtual display of the outcome system (dice or roulette). The motion input by one or more player hands could alter at least one of a) a light display effect around a electronic-field communication input device (e.g., referred to as "the magic Button" (preferably "maGestic"™ button, by Applicants), b) the virtual display itself, and/or c) or a light display around the virtual display, without any actual alteration of the random outcome event in the underlying game.

The inventive technology includes, for example, an electronic gaming system with is a visual display system having a player input station for at least entering wagers on an underlying wagering event, a processor providing signal content to the visual display system; the player input station further comprising an electronic-field communication input device that is simultaneously responsive to a player's hand movements in three dimensions and with respect to velocity; a communication link is present from the electronic-field communication input device to the processor and then to the visual display system to provide image signals transmitted from the processor to the visual display system, the image signals configured to be varied in response to sensed hand movements in at least one of the three dimensions and velocity, wherein the visual display system displays an image varied in response to sensed hand movements;

wherein the caused variations have no effect on a random outcome in the underlying wagering event.

The gaming system further includes a processor configured to provide signal content to the visual display system of the at least some aspect of the wagering event displayed on the visual display system. The player input station further includes an electronic-field communication input device that is simultaneously responsive to a player's hand movements in three dimensions and with respect to velocity. The response to hand movements of the electronic-field communication input device produces signals transmitted from the processor to the visual display system, the signals causing variations in the at least some aspect of the wagering event displayed on the visual display system. These variations in the displayed wagering event corresponds to at least one of the three dimensions and velocity. The caused variations have no effect on a random outcome in the underlying wagering event.

The electronic-field communication input device that is responsive to a player's hand (or other body parts, such as the torso or head) movements may preferably have its own accompanying visual display output, generally of a less sophisticated format than actual images, such as a multicolor panel/array/ring of light emitting elements. For example, there may be a multiple number of color light emitting elements, such as at least four and twenty-plus (e.g., 23, 27, 32, 26 and more) LED emitters (light-emitting diodes) along at least one side, and preferably tending to surround the electronic-field communication input device, The Magic Button, so that local player hand movement or placement will have an immediate and local effect on visual display by the local light-emitting elements. The maGestic™ button itself may be depressed, which may engage a contact or pressure circuit, or hydraulic switch or the like to activate the maGestic™ button color display.

Figure 2:
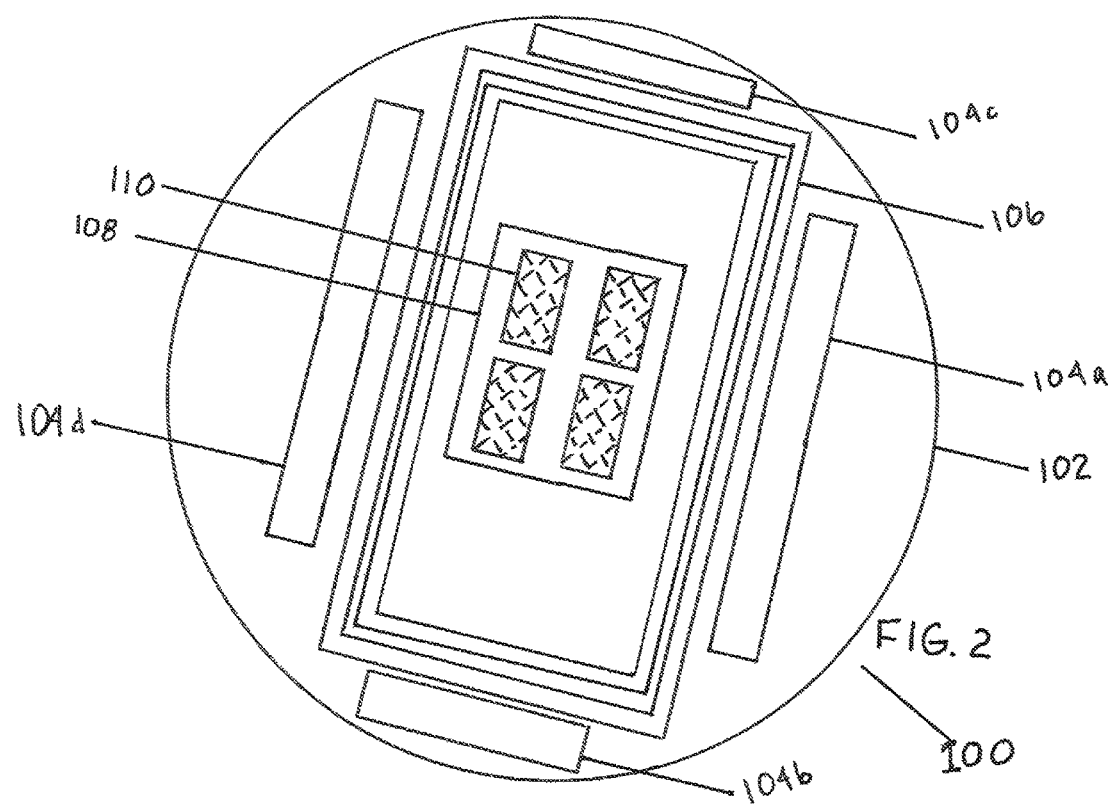
FIG. 2 shows player hand moves over an electronic-field communication input device that is simultaneously responsive to a player's hand movements, which response is shown on a display screen.

The buttons can contain circuitry similar to that in FIG. 2 (which is a motherboard or other integrated circuit board controlling the sensing devices, color imaging electronics, and not inclusive of the LED lights) with additional components enabling response to actual button contact, button depression (into the support plate), button distortion (e.g., where a flexible or rubbery material is used as the bubble or button service).

There is the possibility of driving each LED emitter or pattern of LEDs, or sequences of LEDs, or specific colors and color combinations of LEDs separately, allowing production of a plethora of different visual sequences. Each detected gesture is accompanied by a unique visual LED effect, which gives the player a feedback of what is going on. Additionally, a so called "Screen Saver" mode, which kicks in when no one is using the reader module, may be used to increase the attractiveness of the whole gaming device. There are a number of different categories of interactive response activities or sequences or movement patterns that is can be used alone and/or in combination with each other.

Air wheel detection: An air wheel is a circular motion executed above the reader, either in a clockwise or counter clockwise direction. When detected the current circular position is tracked and transmitted to the gaming software. ●Flick gesture detection: A flick gesture is detected when the players hand moves across the reader module in any of the four cardinal directions. When detected a flick gesture of either north to south, south to north, east to west or west to east is transmitted to the gaming software. ●Presence detection: Player presence is detected as soon as he is a few inches away from the reader module. ●Hold detection: When the players hand is not moving for a defined amount of time, the hold gesture is detected and transmitted to the gaming software. ●Position tracking: As soon as a presence was detected the position tracking mechanism kicks in and tracks and transmits the players hand position in all three (X, Y, Z) dimension. ●Touch detection (more on this later): When a player touches the readers jelly surface, a touch detection is transmitted to the gaming software. Additionally the dominant cardinal positions, of where the module was touched, can be recognized.

One aspect of the technology is enhanced visual entertainment during the execution of an underlying wagering event. The enhancement is purely entertainment value, and cannot alter probabilities, odds, paytables or the like. The enhancement can even be an anger venting alternative for players or a way of expressing excitement over a winning event. Rather than banging on the equipment in anger, the system can flash lights and patterns in response to hand movements, In fact, the system can have an alarm (obvious or secure to casino personnel) to alert personnel or warn the player that excessive movements or contact with force (as determined by hand speed, direction and position where the is movement ceases (e.g., the speed and position indicators can be sensitive enough and software accurate enough to detect significant deceleration as a hand approaches the gaming device to prevent a false alarm.

The maGESTIC reader is packed with multiple features which amongst other cover the security aspect, ease of use and attractiveness, to achieve a pleasant player experience.

RFID Tag Reader

The foremost function of a reader module is of course to read RFID tags. This reader supports handling of ISO 14443A/MIFARE tags, but is functionally optimized to work with MIFARE DESFire EV1 tags.

In a G5 gaming device, contactless tags are used to access the operator menu, review event logs, and perform hand pay payouts when the device is in play mode. Because this directly concerns security and physical access to the machine, the MIFARE DESFire contactless solution was selected over others. MIFARE DESFire uses a DES, 2K3DES, 3K3DES or AES hardware cryptographic engine for securing data transmission indicating the commitment for high levels of security.

To gain machine access, an operator has to identify himself, as by way of a non-limiting example, by placing his contactless card onto the G5 gaming device contactless card reader. Each contactless card has a unique, for example, 7-byte serial number, which is used to identify the operator. To prevent the situation where a valid contactless card serial number would be copied and used for unauthorized machine access, additional precautions are being used. Before the MIFARE DESFire contactless card unique serial number is checked for authorization, an additional 3 pass authentication process is started. Upon successful completion of this process, the contactless card is identified as valid, and the operator is authorized for machine access.

The gaming system may further include a value-in-value-out credit creation component selected from the group consisting of a) a ticket-in-ticket-out system having a ticket-reading scanner (typically with a motor that withdraws input tickets and expels internally printed or defective tickets) and ticket printer, b) a currency validation system having a motor drive to advance currency past a scanner and/or c) a near field communication monetary service system, such as a wallet or iPay, or e-Pay systems. The NFC systems require both a receiver in the gaming machine and a transmitter in a personal electronic communication device or smart card.

Each full NFC device can work in three modes:

NFC card emulation—enables NFC-enabled devices such as smartphones to act like smart cards, allowing users to perform transactions such as payment or ticketing.

NFC reader/writer—enables NFC-enabled devices to read information stored on inexpensive NFC tags embedded in labels or smart posters (gaming tables may have individual wagering areas where appropriate manipulation of the hand-held device will identify a wager type, and then actuation of the hand-held device will signal back into the gaming system receiver (in communication with a gaming processor) which wagers and at what wagering rate, a bet is placed into a wagering event.

NFC peer-to-peer—enables two NFC-enabled devices to communicate with each other to exchange information in an ad hoc fashion. In the gaming environment, the gaming table, possibly overseen by a croupier or pit crew, or by artificial intelligence in the game processor, may interact with the hand-held device.

NFC tags are passive data stores which can be read, and under some circumstances written to, by an NFC device. They typically contain data (as of 2015 between 96 and 8,192 bytes) and are read-only in normal use, but may be rewritable. Applications include secure personal data storage (e.g., debit, credit, player account, margin balances, allowable credit data information within a wagering facility such as casino, race track, card room etc.), loyalty program or comp data information, personal identification numbers (PINs), personal contacts, casino representatives). NFC tags can be custom-encoded by their manufacturers or use the industry specifications. Custom encoding can be enabled by logic or hard circuits that are programmable, such as FPGAs (field programmable gated arrays, or ASICs (application specific integrated circuits).

The standards were provided by the NFC Forum.[4] forum was responsible for promoting the technology and setting standards and certifies device compliance. Secure communications are available by applying encryption algorithms as is done for credit cards[5] and if they fit the criteria for being considered a personal area network, or in this case, a casino area wagering network.

NFC standards cover communications protocols and data exchange formats and are based on existing radio-frequency identification (RFID) standards including ISO/IEC 14443 and FeliCa. The standards also include ISO/IEC 18092 and those defined by the NFC Forum. In addition to the NFC Forum, the GSMA group n defined a platform for the deployment of GSMA NFC Standards within mobile handsets. GSMA's efforts include Trusted Services Manager, Single Wire Protocol, testing/certification and secure elements.

Gesture Detection

One important aspect of the new line of G5 gaming devices is to increase player involvement, to give him/her a feeling that he can somehow influence the game cycle. To achieve this we decided to implement a 3D gesture sensor based on Microchip's patented GestIC® technology. This enables us to detect player gestures and track his/her movement. The interaction with the reader device becomes as simple and intuitive as a wave of the hand.

Supported gestures are:

Air wheel detection: An air wheel is a circular motion executed above the reader, either in a clockwise or counter clockwise direction. When detected the current circular position is tracked and transmitted to the gaming software.

Flick gesture detection: A flick gesture is detected when the players hand moves across the reader module in any of the four cardinal directions. When detected a flick gesture of either north to south, south to north, east to west or west to east is transmitted to the gaming software.

Presence detection: Player presence is detected as soon as he is a few inches away from the reader module.

Hold detection: When the players hand is not moving for a defined amount of time, the hold gesture is detected and transmitted to the gaming software.

Position tracking: As soon as a presence was detected the position tracking mechanism kicks in and tracks and transmits the players hand position in all three (X, Y, Z) dimension.

Touch detection (more on this later): When a player touches the readers jelly surface, a touch detection is transmitted to the gaming software. Additionally the is dominant cardinal positions, of where the module was touched, can be recognized.

LED Effects

There are 24 Light emitting diodes (LED) mounted around the circumference of the reader. The possibility to drive each LED separately allows us to produce a plethora of different visual sequences. Each detected gesture is accompanied by a unique visual LED effect, which gives the player a feedback of what is going on. Additionally a so called "Screen Saver" mode, which kicks in when no one is using the reader module, is used to increase the attractiveness of the whole gaming device.

Touch Feedback

To emulate the behavior of a mechanical button, multiple touch feedback mechanisms are used to stimulate the player senses:

Visual feedback: LEDs produce a quick flash of white, then fade back to a desired color.

Auditory feedback: A small piezoelectric transducer is used to convert electrical pulses to mechanical vibrations, which depending on the input frequency produce a series of tones or melody.

Tactile feedback: A small Eccentric Rotating Mass (ERM) motor is used to produce haptic feedback. Depending on the situation at hand, different vibration sequences can be used, to achieve a desired informational outcome.

Technical Specifications
Power Supply
12 VDC
Microprocessor
PIC32MX; MIPS32 M4K Core; 100 MHz
64 Kbyte of RAM; 128 Kbyte of FLASH memory
Miscellaneous
I2c communication channel with
Main Module—PC
24 RGB LEDs
13.56 MHz RFID MIFARE tag reader Gesture Detection With regard to any tactile systems, or some of the more shortened areas of communication system, wands, cards, gloves (less sanitary unless single use (disposable) gloves are provided, or if plastic liners are used under the gloves) and other tools may be provided by the casino to individual players to provide higher field recognition within the system. The tools may have internally powered (e.g., batteries) or field-powered transmitters, receivers and the like.

The new maGESTIC button "replaces" the proprietary older Interblock USA, LLC G50 Reader and provides unique and different additional functions, as described above with respect to at least the light display.

It appears that an RFID tag may also be provided to the player to enhance communication by motion interaction with the maGESTIC Button. So this system preferably is not intended to be a broad use of near field communication, but a specific e-field communication link, as opposed to a more standard RFID based communication with the user/player having some RFID tag, glove, etc. These further implements (glove, etc.) may provide more enhanced sensing by the maGESTIC™ Button.

The maGESTIC™ button can be more than just a replacement module, for the G5 Reader, which, on top of detecting RFID tags, also detects the players hand movement & gestures. The movement and gesture detection has nothing to do with near field communication (NFC), which in this case applies only to RFID tag detection. What we have accomplished with the maGESTIC™ button is to successfully incorporate two technologies, RFID detection on one hand and Gesture/motion detection on the other, which typically interfere with one another. The gesture detection works by generating an electromagnetic field and measuring the distortions, a body part passing through the sensing area, produces.

The LED component of the maGestic button has at least two roles. During the period when there is no player interaction, the LEDs work in the so called "Screen Saver" mode and run through a series of RGB LED effects. During player interaction, the LEDs visualize the detected gesture and hand position and there is also a special LED effect for when an RFID tag is detected.

The maGESTIC reader is a multifunctional electronic module, which primary function is to read MIFARE RFID tags. With its unique feature of gesture detection it enriches the player experience and increases his/her involvement into the game itself. Because it is a direct replacement of the currently used G5 Reader Module, it perfectly fits into the same mounting place.

The maGESTIC reader is packed with multiple features which amongst other cover the security aspect, ease of use and attractiveness, to achieve a pleasant player experience. The major features are: ●RFID tag reader support for handling of ISO 14443A/MIFARE tags. ●3D gesture detection Touch detection, Presence detection, Hand position tracking, Air wheel detection, Hand flick detection; ●Light effects—24 LEDs mounted around the circumference of the reader. ●Touch feedback—Visual, auditory and tactile feedback See the functional specification (FSPEC_maGESTIC_Reader.pdf) for more details. 4 Technical specifications 4.1 Request The maGESTIC reader is an I2C module, which means it resides on the second level of the communication hierarchy inside a play station. As it does not directly communicate with the PC software all requests must be send through one of the Main Module options, as an I2C packet. Table 1: Structure of an outgoing I2C packet Send I2C packet Value Description Command 0xC8 Send I2C packet command Length 0x. packet overhead+number of I2C data bytes [3 . . . 22] I2C Address 0x3C Reader I2C Slave address I2C Com 0x . . . I2C Command Byte I2C Length 0x. number of I2C data byte I2C DataX 0x . . . I2C data bytes (max 19 data bytes) 4.1.1 Get program version Value Description I2C Com 0x65 Common GET command I2C Length 0x01 number of data bytes I2C Data0 0x0B Get PROGRAM VERSION command 4.1.2 Get factory ID Value Description I2C Com 0x65 Common GET command I2C Length 0x01 number of data bytes I2C Data0 0x13 Get FACTORY ID command 4.1.3 Get production date Value Description I2C Com 0x65 Common GET command I2C Length 0x01 number of data bytes I2C Data0 0x14 Get PRODUCTION DATE command 4.1.4 Get checksum Value Description I2C Com 0x65 Common GET command I2C Length 0x01 number of data bytes I2C Data0 0x09 Get CHECKSUM command 4.1.5 Get power supply voltage Value Description I2C Com 0x65 Common GET command I2C Length 0x01 number of data bytes I2C Data0 0x18 Get POWER SUPPLY VOLTAGE command 4.1.6 Get CRC Value Description I2C Com 0x65 Common GET command I2C Length 0x03 number of data bytes I2C Data0 0x08 Get CRC command I2C Data1 0x . . . 16 bit Seed LO I2C Data2 0x . . . 16 bit Seed HI 4.1.7 Get RFID Options Value Description I2C Com 0x65 Common GET command I2C Length 0x01 number of data bytes I2C Data0 0x17 Get READER (RFID) OPTIONS command 4.1.8 Set RFID Options Value Description I2C Com 0xA0 SET READER (RFID) OPTIONS command I2C Length 0x04 number of data bytes I2C Data0

0x. Reader flags I2C Dotal 0x00 RFU I2C Data2 0x00 RFU I2C Data3 0x00 RFU 4.1.9 Get CRC Value Description I2C Com 0x65 Common GET command I2C Length 0x03 number of data bytes I2C Data0 0x09 Get CRC command I2C Data1 0x . . . 16 bit Seed LO I2C Data2 0x . . . 16 bit Seed HI 4.2 Responses Because the maGESTIC reader resides on the second level of the communication hierarchy, it does not communicate with the PC software directly. All responses must be send through one of the Main Mobile options, as an I2C pack.

Software executed by the gaming processor in response to the electronic-field communication system may include lines such as some of the following:

```
4.4 Enumerators 4.4.1 RFID Tag Type enum rfid_tag_type_e {
RFID_TAG_TYPE_MIFARE_ULTRALIGHT = 0x00,
RFID_TAG_TYPE_MIFARE_CLASSIC_1K = 0x08,
RFID_TAG_TYPE_MIFARE_MINI = 0x09,
RFID_TAG_TYPE_MIFARE_CLASSIC_4K = 0x18,
RFID_TAG_TYPE_MIFARE_DESFIRE = 0x20, }; 4.4.2 Gesture ID enum
gestic_gestures_e { GESTIC_GEST_NONE = 0, // Gesture: No gesture
GESTIC_GEST_GARBAGE = 1, // Gesture: Garbage model
GESTIC_GEST_FLICK_W2E = 2, // Gesture: Flick West to East
GESTIC_GEST_FLICK_E2W = 3, // Gesture: Flick East to West
GESTIC_GEST_FLICK_S2N = 4, // Gesture: Flick South to North
GESTIC_GEST_FLICK_N2S = 5, // Gesture: Flick North to South
GESTIC_GEST_CIRCLE_CW = 6, // Gesture: Airwheel clockwise
GESTIC_GEST_CIRCLE_CCW = 7, // Gesture: Airwheel counter clockwise
GESTIC_GEST_WAVE_X = 8, // Gesture: Wave X GESTIC_GEST_WAVE_Y =
9, // Gesture: Wave Y GESTIC_GEST_HOLD = 64, // Gesture: Hold
GESTIC_GEST_EDGE_FLICK_W2E = 65, // Gesture: Edge Flick West to East
GESTIC_GEST_EDGE_FLICK_E2W = 66, // Gesture: Edge Flick East to West
GESTIC_GEST_EDGE_FLICK_S2N = 67, // Gesture: Edge Flick South to North
GESTIC_GEST_EDGE_FLICK_N2S = 68, // Gesture: Edge Flick North to South
GESTIC_GEST_DOUBLE_FLICK_W2E = 69, // Gesture: Double Flick West to
East GESTIC_GEST_DOUBLE_FLICK_E2W = 70, // Gesture: Double Flick East
to West GESTIC_GEST_DOUBLE_FLICK_S2N = 71, // Gesture: Double Flick
South to North GESTIC_GEST_DOUBLE_FLICK_N2S = 72, // Gesture: Double
Flick North to South GESTIC_GEST_PRESENCE = 73, // Gesture: Presence };
Note: Not all gestures are reported to the PC. 4.4.3 Touch Flags enum
gestic_touch_flags_e { GESTIC_TOUCH_FLAG_SOUTH = 0x01,
GESTIC_TOUCH_FLAG_WEST = 0x02, GESTIC_TOUCH_FLAG_NORTH = 0x04,
GESTIC_TOUCH_FLAG_EAST = 0x08,
GESTIC_TOUCH_FLAG_CENTER = 0x10,
```

In executing wagering events on the gaming systems of the present technology with a value-in-value-out credit creation component selected from the group consisting of a) a ticket-in-ticket-out system having a ticket-reading scanner and ticket printer, b) a currency validation system having a motor drive to advance currency past a scanner and/or c) a near field communication monetary service system, the method of enhancing wagering experience at a gaming apparatus may further include:

before or after placing a wager on a random outcome wagering event at the gaming apparatus, the wager credited against stored credit deposited by through the value-in-value out credit creation component in the electronic gaming system, a player at the player position may move or place a hand in electronic-field communication responsive distances from the electronic-field communication input device, wherein movement of placement of the player's hand in electronic-field communication responsive distances from the electronic-field communication input device to cause the processor to vary light effects on the visual display, as by executing code stored in memory.

FIG. 1 discloses a player input electronic gaming machine with a panel having an electronic-field communication input device that is simultaneously responsive to a player's hand movements. Turning next to FIG. 1, a video gaming machine 2 of the present invention is shown. Machine 2 includes a main cabinet 4, which generally surrounds the machine interior (not shown) and is viewable by users. The main cabinet includes a main door 8 on the front of the machine, which opens to provide access to the interior of the machine. Attached to the main door are player-input switches or buttons 32, a coin acceptor 28, and a bill validator 30, a coin tray 38, and a display area including a panel 40 on the mechanical gaming system (or less preferably a separate electronic game) 2 carrying the hemispheric maGestic field sensitive element 46. There may be an overlay of touch-screen functionality on the separate electronic game 40 carrying the hemispheric maGestic field sensitive element 46 or some of the buttons 32 may be functional on the separate mechanical gaming system 40. That separate mechanical gaming system may be in a relatively vertical viewing position as shown, or in a more horizontal (table like) display unit. Viewable through the main door is a video display monitor 34 and an information panel 36. The display monitor 34 will typically be a cathode ray tube, high resolution flat-panel LCD, LED, plasma screen or other conventional electronically controlled video monitor. The information panel 36 may be a back-lit, silk screened glass panel with lettering to indicate general game information including, for example, a game denomination (e.g. $0.25 or $1). The bill validator 30, player-input switches 32, video display monitor 34, and information panel are devices used to play a game on the game machine 2. The devices are controlled by circuitry (e.g. the master gaming controller) housed inside the main cabinet 4 of the machine 2. A hand moving within the range of field sensitivity can alter the displays on any of the light emitting elements on the gaining machine 2, such as the back panel 40, the video display monitor 32, or on the top box display 45. The buttons 32 may include a button which is configured to instruct the processor, or a separate maGestic™ light emitting processor/integrated circuit to cause the buttons 32 to perform its light display. This display may be an automated sequence, random sequence, or temporarily enable the maGestic button to respond to electric-field interference by a player's hand(s).

There may be a timing function in a circuit board (e.g., field programmable gated array, application specific integrated circuit, or simple timing circuit that turns power on and off after button 32 activation.

As previously indicated, the maGestic button (light display) is preferably the bubble or hemisphere as shown in the figures. This may operate as the sole light display, or traditional light panels around the electronic gaming machine or gaming table may also be activated by the activation of the maGestic™ light display button or the activating buttons 32. There may be a top box with added special light displays that act in concert with or separate from the maGestic™ light display button and/or upon activation by a panel button 32.

Although not essential to the performance of the present invention, the maGestic™ button and light system may interact with the underlying gaming event play in the electronic gaming system. For example, when the maGestic™ button light is operating at certain speeds, or in certain colors, etc., the processor in or connected to the maGestic™ button and light display can interact with the underlying gaming system. As an example, if it is connected to a dice generator the electronic-field communication input device should be able to determine the speed and/or height, with which to shake, throw or pop the dice. Similarly, in an automated roulette system, the wheel may be spun faster and/or slower, the deceleration of the wheel may be enhanced, and the like. In an electronic gaming machine, reels may be spun faster or slower (without affecting the weighting of the frames, whether virtual or physical, nor change the underlying math and probabilities of the game system).

Many different types of games, including mechanical slot games, video slot games, video poker, video black jack, video pachinko and lottery, may be provided with gaming machines of this invention. In particular, the gaming machine 2 may be operable to provide a play of many different instances of games of chance. The instances may be differentiated according to themes, sounds, graphics, type of game (e.g., slot game vs. card game), denomination, number of paylines, maximum jackpot, progressive or non-progressive, bonus games, etc. The gaming machine 2 may be operable to allow a player to select a game of chance to play from a plurality of instances available on the gaming machine. For example, the gaming machine may provide a menu with a list of the instances of games that are available for play on the gaming machine and a player may be able to select from the list a first instance of a game of chance that they wish to play.

The various instances of games available for play on the gaming machine 2 may be stored as game software on a mass storage device in the gaming machine or may be generated on a remote gaming device but then displayed on the gaming machine. The gaming machine 2 may executed game software, such as but not limited to video streaming software that allows the game to be displayed on the gaming machine. When an instance is stored on the gaming machine 2, it may be loaded from the mass storage device into a RAM for execution. In some cases, after a selection of an instance, the game software that allows the selected instance to be generated may be downloaded from a remote gaming device, such as another The gaming machine 2 includes a top box 6, which sits on top of the main cabinet 4. The top box 6 houses a number of devices, which may be used to add features to a game being played on the gaming machine 2, including speakers 10, 12, 14, a ticket printer 18 which reads tickets (with a scanner (not shown as internal) and prints bar-coded tickets 20, a key pad 22 for entering player tracking information, a florescent display 16 for displaying player tracking information, a card reader 24 for entering a magnetic striped card containing player tracking information, and a video display screen 42. The ticket printer 18 may be used to print tickets for a cashless ticketing system and the same slot opening may receive tickets to be scanned or receive paper currency to be scanned. Further, the top box 6 may house different or additional devices than shown in the FIG. 1. For example, the top box may contain a bonus wheel or a back-lit silk-screened panel which may be used to add bonus features to the game being played on the gaming machine. As another example, the top box may contain a display for a progressive jackpot offered on the gaming machine. During a game, these devices are controlled and powered, in part, by circuitry (e.g. a master gaming controller) housed within the main cabinet 4 of the machine 2.

FIG. 2 shows an open (cutaway) maGestic field sensitive antenna element 100 that has integrated two ordinarily interfering technologies into one antenna design. This element 100 is shown with a bubble cover 102, four encompassing receiver electrodes (North, East, West and South antenna) 104a 104b 104c and 104d and a central receiver electrode 106. The central receiver electrode 106 surrounds MIFARE tags 110 supported on a frame 108. These elements and their generically illustrated orientations (the four encompassing receiver electrodes (antenna 104a 104b 104c and 104d) may be the same or different sizes, their shapes need not be quadrilateral but may be slightly oval, the same with the central RFID receiver antenna 106 and the central antenna 110 to implement the visual effect).

LED lights of multiple, varying or different colors may be positioned within or surrounding or both with and surrounding the bubble cover 102. The bubble cover 102 may be transparent, translucent, refractive or otherwise constructed to enhance the light image.

Although specific sizes and shapes and other parameters may have been specifically disclosed, these are intended to be exemplary of the generic concept and not limiting the claims, unless specifically recited in the claims.

What is claimed:
1. An electronic gaming system with a visual display system having a player input station for at least entering wagers on an underlying wagering event, comprising:
   a processor providing signal content to the visual display system, the visual display system displaying non-outcome altering effects and outcome altering effects associated with the wagering event, wherein the outcome altering effects are based on a random outcome;
   the player input station further comprising an electronic-field communication input device that is simultaneously responsive to a player's hand movements in three dimensions and with respect to velocity; and
   a communication link between the electronic-field communication input device and the processor and between the processor and the visual display system to provide image signals transmitted from the processor to the visual display system, the image signals configured to be varied in response to sensed hand movements in at least one of the three dimensions and velocity, wherein the visual display system displays the non-outcome altering effects that are varied in response to sensed hand movements and the non-outcome altering effects have no effect on the random outcome and no outcome altering effects.

2. The gaming system of claim 1 wherein the visual display system comprises a distribution of light-emitting elements on a surface of the player input station.

3. The gaming system of claim 2 wherein the distribution of light-emitting elements comprises multiple multicolor light-emitting elements.

4. The gaming system of claim 3 wherein the multiple multicolor light-emitting elements comprise multicolor light emitting diodes.

5. The gaming system of claim 1 wherein the electronic-field communication input system comprises multiple antennae in a component embedded on the gaming system, the multiple antenna comprising at least two horizontally sensitive antennae and at least one vertically sensitive antenna.

6. The gaming system of claim 3 wherein the electronic-field communication input system comprises multiple antennae in a component embedded on the gaming system, the multiple antenna comprising at least two horizontally sensitive antennae and at least one vertically sensitive antenna.

7. The gaming system of claim 1 wherein the player's hand has a transmitting or responsive device thereon which communicates the hand movement to the electronic-field communication input device.

8. The gaming system of claim 3 wherein the player's hand has a transmitting or responsive device thereon which communicates the hand movement to the electronic-field communication input device.

9. The gaming system of claim 1 wherein the transmitting or responsive device includes a radio frequency identification tag which communicates the hand movement to the electronic-field communication input device.

10. The gaming system of claim 3 wherein the player's hand has a transmitting or responsive device comprising a radio frequency identification tag thereon which communicates the hand movement to the electronic-field communication input device.

11. The gaming system of claim 7 wherein the transmitting or responsive device includes a radio frequency identification tag which communicates the hand movement to the electronic-field communication input device.

12. The gaming system of claim 1 further comprising a player input panel, and wherein the electronic-field communication input device is located on the player input panel.

13. The gaming system of claim 3 further comprising a player input panel, and wherein the electronic-field communication input device is located on the player input panel.

14. The gaming system of claim 7 further comprising a player input panel, and wherein the electronic-field communication input device is located on the player input panel.

15. The gaming system of claim 11 further comprising a player input panel, and wherein the electronic-field communication input device is located on the player input panel.

16. A method of enhancing wagering experience at a gaming apparatus comprising:
before or after placing a wager on a random outcome wagering event at the gaming apparatus comprising the electronic gaming system of claim 1, wherein a player at the player position moves or places a hand in electronic-field communication responsive distances from the electronic-field communication input device, wherein movement of placement of the player's hand in near-field communication responsive distances from the electronic-field communication input device causes the processor to vary non-outcome altering effects on the visual display system.

17. A method of enhancing wagering experience at a gaming apparatus comprising:
before or after placing a wager on a random outcome wagering event at the gaming apparatus comprising the electronic gaming system of claim 3, wherein a player at the player position moves or places a hand in electronic-field communication responsive distances from the electronic-field communication input device, wherein movement of placement of the player's hand in electronic-field communication responsive di stances from the electronic-field communication input device causes the processor to vary non-outcome altering effects on the visual di splay system.

18. A method of enhancing wagering experience at a gaming apparatus comprising:
before or after placing a wager on a random outcome wagering event at the gaming apparatus comprising the electronic gaming system of claim 7, wherein a player at the player position moves or places a hand in electronic-field communication responsive distances from the electronic-field communication input device, wherein movement of placement of the player's hand in electronic-field communication responsive distances from the electronic-field communication input device causes the processor to vary non-outcome altering effects on the visual display system.

19. The electronic gaming system of claim 1 wherein individual player positions at the electronic gaming system further comprise a value-in-value-out credit creation component selected from the group consisting of a) a ticket-in-ticket-out system having a ticket-reading scanner and ticket printer, b) a currency validation system having a motor drive to advance currency past a scanner and/or c) a near field communication monetary service system.

20. A method of enhancing wagering experience at a gaming apparatus comprising:
before or after placing a wager on a random outcome wagering event at the gaming apparatus, the wager credited against stored credit deposited by through the value-in-value out credit creation component comprising the electronic gaming system of claim 19, wherein a player at the player position moves or places a hand or in electronic-field communication responsive distances from the electronic-field communication input device, wherein movement of placement of the player's hand in near-field communication responsive distances from the near-field communication input device causes the processor to non-outcome altering effects on the visual display system.

* * * * *